US008964851B2

(12) United States Patent
Liu et al.

(10) Patent No.: US 8,964,851 B2
(45) Date of Patent: Feb. 24, 2015

(54) DUAL-MODE COMPRESSION OF IMAGES AND VIDEOS FOR RELIABLE REAL-TIME TRANSMISSION

(75) Inventors: Wei Liu, San Jose, CA (US); Mohammad Gharavi-Alkhansari, Santa Clara, CA (US); Ali Tabatabai, Cupertino, CA (US); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 428 days.

(21) Appl. No.: 12/792,408

(22) Filed: Jun. 2, 2010

(65) Prior Publication Data

US 2010/0309984 A1  Dec. 9, 2010

Related U.S. Application Data (60) Provisional application No. 61/185,560, filed on Jun. 9, 2009.

(51) Int. Cl.
| | | |
|---|---|---|
| *H04N 11/04* | (2006.01) | |
| *H04N 11/02* | (2006.01) | |
| *G06K 9/36* | (2006.01) | |
| *F01L 1/18* | (2006.01) | |
| *F01L 1/26* | (2006.01) | |

(52) U.S. Cl.
CPC ...... *F01L 1/185* (2013.01); *F01L 1/267* (2013.01)
USPC ............ 375/240.24; 375/240.12; 375/240.16; 375/240.21; 375/240.26; 382/232

(58) Field of Classification Search
None
See application file for complete search history.

(56) References Cited

U.S. PATENT DOCUMENTS

| | | | |
|---|---|---|---|
| 4,546,385 | A | 10/1985 | Anastassiou |
| 5,724,100 | A | 3/1998 | Kuchibhotla |
| 5,850,261 | A | 12/1998 | Kondo |
| 5,903,676 | A | 5/1999 | Wu et al. |

(Continued)

FOREIGN PATENT DOCUMENTS

| | | | |
|---|---|---|---|
| CN | 1258981 | A | 7/2000 |
| CN | 1625893 | A | 6/2005 |

(Continued)

OTHER PUBLICATIONS

Tan and Zakhor, "Real-Time Internet Video Using Error Resilient Scalable Compression and TCP-Friendly Transport Protocol." IEEE Transactions on Multimedia, vol. 1, No. 2, Jun. 1999.

(Continued)

*Primary Examiner* — Frederick Bailey
(74) *Attorney, Agent, or Firm* — Haverstock & Owens LLP (57) ABSTRACT

Dual-mode compression of images/videos for reliable real-time transmission includes a scalable block-based video compression. The method provides graceful quality degradations in case of channel bandwidth changes. Prediction for encoding is avoided, and the process is less complex with less memory requirements. The method involves processing each block independently with the advantage that errors are not able to propagate beyond current block boundaries. Two different encoding modes are used, natural image coding for acquired images and graphics coding for computer generated images. The proper encoding mode is chosen by comparing performance of the two modes for a particular block to be encoded. An embedded bitstream is generated by the encoder in accordance to the available channel bandwidth.

21 Claims, 5 Drawing Sheets

(56) References Cited

U.S. PATENT DOCUMENTS

| | | | |
|---|---|---|---|
| 6,052,205 | A | 4/2000 | Matsuura |
| 6,091,777 | A | 7/2000 | Guetz et al. |
| 6,256,415 | B1* | 7/2001 | Ratnakar .................. 382/232 |
| 6,272,180 | B1 | 8/2001 | Lei |
| 6,501,397 | B1 | 12/2002 | Radha et al. |
| 6,567,081 | B1 | 5/2003 | Li et al. |
| 6,614,939 | B1 | 9/2003 | Yamauchi |
| 6,909,811 | B1 | 6/2005 | Kajiwara et al. |
| 6,983,075 | B2 | 1/2006 | Schwartz |
| 7,085,424 | B2 | 8/2006 | Kajiki et al. |
| 7,194,140 | B2 | 3/2007 | Ito et al. |
| 7,321,697 | B2 | 1/2008 | Sudharsanan et al. |
| 7,356,191 | B2 | 4/2008 | Hosaka |
| 7,505,624 | B2 | 3/2009 | Ogden et al. |
| 7,567,719 | B2 | 7/2009 | Kalevo et al. |
| 7,689,051 | B2 | 3/2010 | Mukerjee |
| 7,742,645 | B2 | 6/2010 | Nakamura |
| 8,170,357 | B2 | 5/2012 | Kim et al. |
| 8,213,729 | B2 | 7/2012 | Kajiwara |
| 2002/0003905 | A1 | 1/2002 | Sato et al. |
| 2003/0016753 | A1* | 1/2003 | Kim et al. ............... 375/240.21 |
| 2003/0035476 | A1 | 2/2003 | Ohyama et al. |
| 2003/0229822 | A1* | 12/2003 | Kim et al. .................... 714/18 |
| 2004/0213472 | A1 | 10/2004 | Kodama et al. |
| 2005/0001928 | A1 | 1/2005 | Takagi |
| 2005/0058207 | A1* | 3/2005 | Magee et al. ............ 375/240.26 |
| 2005/0152605 | A1 | 7/2005 | Hoogendijk |
| 2005/0195897 | A1 | 9/2005 | Cha |
| 2005/0226325 | A1* | 10/2005 | Dei et al. ................. 375/240.12 |
| 2005/0265459 | A1* | 12/2005 | Bhattacharjya et al. . 375/240.24 |
| 2005/0276493 | A1* | 12/2005 | Xin et al. ...................... 382/239 |
| 2006/0044576 | A1 | 3/2006 | Tabata et al. |
| 2006/0072838 | A1 | 4/2006 | Chui et al. |
| 2006/0133494 | A1* | 6/2006 | Saxena et al. ............ 375/240.16 |
| 2007/0019869 | A1 | 1/2007 | Strom |
| 2007/0110151 | A1 | 5/2007 | Yu et al. |
| 2007/0153916 | A1* | 7/2007 | Demircin et al. ......... 375/240.26 |
| 2007/0217695 | A1 | 9/2007 | Nakamura |
| 2008/0043846 | A1 | 2/2008 | Yokoyama |
| 2008/0101464 | A1 | 5/2008 | Lei |
| 2008/0159640 | A1 | 7/2008 | Liu et al. |
| 2008/0240584 | A1 | 10/2008 | Saiga et al. |
| 2008/0297620 | A1 | 12/2008 | Goel |
| 2009/0067495 | A1 | 3/2009 | Au et al. |
| 2009/0202164 | A1 | 8/2009 | Rossato et al. |
| 2009/0214128 | A1 | 8/2009 | Chen |
| 2009/0245384 | A1* | 10/2009 | Fukuhara et al. ........ 375/240.24 |
| 2010/0002943 | A1 | 1/2010 | Moon et al. |
| 2011/0033126 | A1 | 2/2011 | Liu |
| 2011/0033127 | A1 | 2/2011 | Rasmusson et al. |

FOREIGN PATENT DOCUMENTS

| | | |
|---|---|---|
| CN | 101217668 A | 7/2008 |
| CN | 101233760 A | 7/2008 |
| EP | 0618727 B1 | 3/1999 |
| EP | 2081155 A1 | 7/2009 |
| JP | 2008124926 A | 5/2008 |
| KR | 1020020026242 A | 4/2002 |
| KR | 1020060045712 | 5/2006 |
| WO | 0049571 A2 | 8/2000 |
| WO | 03065709 A | 8/2003 |

OTHER PUBLICATIONS

Van der Schaar and Radha, "Unequal Packet Loss Resilience for Fine-Granular-Scalability Video," IEEE Transactions on Multimedia, vol. 3, No. 4, Dec. 2001.

Golchin, F. et al. ,"A lossless image coder with context classification, adaptiveprediction and adaptive entropy coding", Acoustics, Speech and Signal Processing, 1998. Proceedings of the 1998 IEEE International Conference, May 12-15, 1998, vol. 5,pp. 2545-2548.

Wu, X. et al., "Context-based, adaptive, lossless image coding", Communications, IEEE Transactions, Apr. 1, 1997, vol. 45, Issue 4, pp. 437-444.

* cited by examiner

DUAL-MODE COMPRESSION OF IMAGES AND VIDEOS FOR RELIABLE REAL-TIME TRANSMISSION

RELATED APPLICATION(S)

This patent application claims priority under 35 U.S.C. §119(e) of the U.S. Provisional Patent Application, Ser. No. 61/185,560, filed Jun. 9, 2009, and entitled "Compression for Wireless HD 1.1". The Provisional Patent Application, Ser. No. 61/185,560, filed Jun. 9, 2009 and entitled "Compression for Wireless HD 1.1" is also hereby incorporated by reference in its entirety.

FIELD OF THE INVENTION

The present invention relates to the field of image processing. More specifically, the present invention relates to dual-mode image/video compression for reliable real-time transmission.

BACKGROUND OF THE INVENTION

There are two growing technologies that complement each other yet generate a need to solve issues regarding the combination of the two. 1) High definition (HD) video is the next generation of video which includes much more data than standard definition video thus enabling much clearer and more vivid video. Since HD video includes so much data, to transport the data from one location to another, particularly, wirelessly, utilizes a significant amount of bandwidth. To decrease the utilized bandwidth while preserving the HD quality, encoding/compression schemes are utilized when transmitting the data. 2) Real-time transmission of data enables real-time and interactive applications such as video conferencing and online gaming. In real-time video transmission, it is important to adapt the data rate with respect to the changes of the available bandwidth, which requires scalable encoding/compression schemes performed to the video data.

One example of wireless transmission is Wireless HD 1.0. The Wireless HD 1.0 standard defines a wireless video area network (WVAN) for the connection of consumer electronic (CE) audio and video devices. A key attribute of the WirelessHD system is its ability to support the wireless transport of an uncompressed 1080 p A/V stream with a high quality of service (QoS) within a room at distances of ten meters.

The requirement for high data throughput at distances of 10 meters requires a large allocated frequency spectrum. A large amount spectrum is available on an unlicensed basis in many countries in the 60 GHz band. In North America and Japan, a total of 7 GHz is allocated for use, 5 GHz of which is overlapping. The band 57~64 GHz is allocated in North America while 59-66 GHz is allocated in Japan. In addition, Korea and the European Union have also allowed similar allocations. The regulator agencies allow very high effective transmit power (the combination of transmitter power and antenna gain), greater than 10 W of effective isotropic radiated power (EIRP). High EIRP and wide allocated bandwidth will allow high throughput connections that, however, are very directional.

The WirelessHD 1.0 specification defines a wireless protocol that enables directional connections that adapt very rapidly to changes in the environment. This is accomplished by dynamically steering the antenna beam at the transmitter while at the same time focusing the receiver antenna in the direction of the incoming power from the transmitter. This dynamic beam forming and beam steering utilizes not only the direct path, but allows the use of reflections and other indirect paths when the line-of-sight connection is obstructed. This dynamic adjustment of the antenna energy is completed in less than one millisecond.

The WVAN includes one Coordinator and zero or more Stations. The Coordinator schedules time in the channel to ensure that the wireless resources are prioritized for the support of A/V streams. The other devices that are a part of the WVAN are referred to as Stations. A station may be the source and/or sink of data in the network. The device that is the Coordinator also acts as a Station in the WVAN and may act as a source and/or sink of data. <http://www.wirelesshd.org/technology.html>

SUMMARY OF THE INVENTION

The dual-mode compression scheme includes a scalable block-based video compression. The method provides graceful quality degradations in case of channel bandwidth changes. Prediction for encoding is avoided, and the process is less complex with less memory requirements, and the drift error due to bit-rate changes is avoided. The method involves processing each block independently with the advantage that errors are not able to propagate beyond current block boundaries. Two different encoding modes are used, natural image coding for acquired images and graphics coding for computer generated images. The graphics coding is specifically designed for computer generated contents such as (but not limited to) graphics and texts, for which traditional natural image coding schemes (e.g. DCT based ones) do not work well. The proper encoding mode is chosen by comparing performance of the two modes for a particular block to be encoded. An embedded bitstream is generated by the encoder.

In one aspect, a method of compression programmed in a controller in a device comprises partitioning an image into one or more blocks, determining if a block of the image is from a natural image or a computer generated image, if the block is from a natural image, then a natural image coding is applied to the block, generating a coded bitstream and if the block is from a computer generated image, then a graphics coding is applied to the block generating the coded bitstream. Natural image coding comprises applying a 2D discrete cosine transform (DCT) (or other spectral transforms) to the block and coding resulting transform coefficients from the most significant bit-plane (MSB) to the least significant bit-plane (LSB) such that a resulting bitstream is embedded. The graphics coding mode includes coding pixels in the block from the most significant bit-plane (MSB) to the least significant bit-plane (LSB) and not performing any transform on the block. The method further comprises applying unequal error protection in different bit-planes. Determining the mode is based on a performance of the two coding modes for the block being encoded. The method further comprises storing the coded bitstream in a post-encoding buffer. The method further comprises extracting information from the post-encoding buffer for each block based on available channel bandwidth, transmitting mode information for the block, and discarding remaining bits. The method further comprises transmitting the extracted information and the mode information to a physical layer. The controller is selected from the group consisting of a programmed computer readable medium and an application-specific circuit. The method further comprises bit sharing between blocks. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a system for compression programmed in a controller in a device comprises a mode decision module for determining if a block of an image is from a natural image or a computer generated image, a natural image coding module for generating a coded bitstream by applying a natural image coding to the block if the block is from a natural image and a graphics coding module for generating the coded bitstream by applying a graphics coding to the block if the block is from a computer generated image. The system further comprises a pre-encoding buffer for partitioning an image into one or more blocks. Natural image coding comprises applying a 2D discrete cosine transform (DCT) (or other spectral transforms) to the block and coding resulting transform coefficients from the most significant bit-plane (MSB) to the least significant bit-plane (LSB) such that the resulting bitstream is embedded. The graphics coding mode includes coding pixels in the block from the most significant bit-plane (MSB) to the least significant bit-plane (LSB) and not performing a transform on the block. The mode decision module determines the mode based on a performance of the two coding modes for the block being encoded. The system further comprises a post-encoding buffer for storing the coded bitstream. The system further comprises a framing module for extracting information from the post-encoding buffer for each block based on available channel bandwidth, transmitting mode information for the block, and discarding remaining bits. The framing module transmits the extracted information and the mode information to a physical layer. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a camera device comprises a video acquisition component for acquiring a video, a memory for storing an application, the application for partitioning an image into one or more blocks, determining if a block of the image is from a natural image or a computer generated image, if the block is from a natural image, then a natural image coding is applied to the block generating a coded bitstream and if the block is from a computer generated image, then a graphics coding is applied to the block generating the coded bitstream and a processing component coupled to the memory, the processing component configured for processing the application.

In yet another aspect, a network of devices comprises a network, a server device for storing a high definition video and for transferring a compressed version of the high definition video over the network, wherein the compressed version of the high definition video is generated by partitioning each image of the video into one or more blocks, determining if a block of the image is from a natural image or a computer generated image, if the block is from a natural image, then a natural image coding is applied to the block generating a coded bitstream and if the block is from a computer generated image, then a graphics coding is applied to the block generating the coded bitstream and a player device for receiving the compressed version of the high definition video and for playing the compressed version of the high definition video. The compressed version of the high definition video is decoded before being played.

DETAILED DESCRIPTION OF THE PREFERRED EMBODIMENT

A dual-mode compression scheme for use with reliable real-time image/video transmission is described herein. In WiHD 1.0, a video signal is not compressed. To adapt to available channel bandwidth changes, a subset of pixels are discarded. In the dual-mode compression scheme, a low-complexity, scalable video coder/decoder (codec) is used which is described herein. The dual-mode codec provides graceful video quality degradation when the available channel bandwidth changes.

In the dual-mode codec, information from previous frames is not used for coding, a frame buffer is not needed for previous frames, and there is no search for motion estimation. This lowers memory requirements and complexity. The implementation is block-based, where the encoder and decoder process each block independently. This also uses less memory and is less complex. The bitstream is able to be embedded such that each block is able to be stopped anywhere. Since the bitstream is embedded, it is easily adapted to bandwidth changes. There is no need for transcoding and no need for generation of multiple bitstreams. It is also easily combined with unequal error protection. The dual-mode compression has high efficiency and has a mode for computer generated images, and a trade-off exists between coding efficiency and error resiliency. The dual-mode compression also has low latency.

Figure 1:
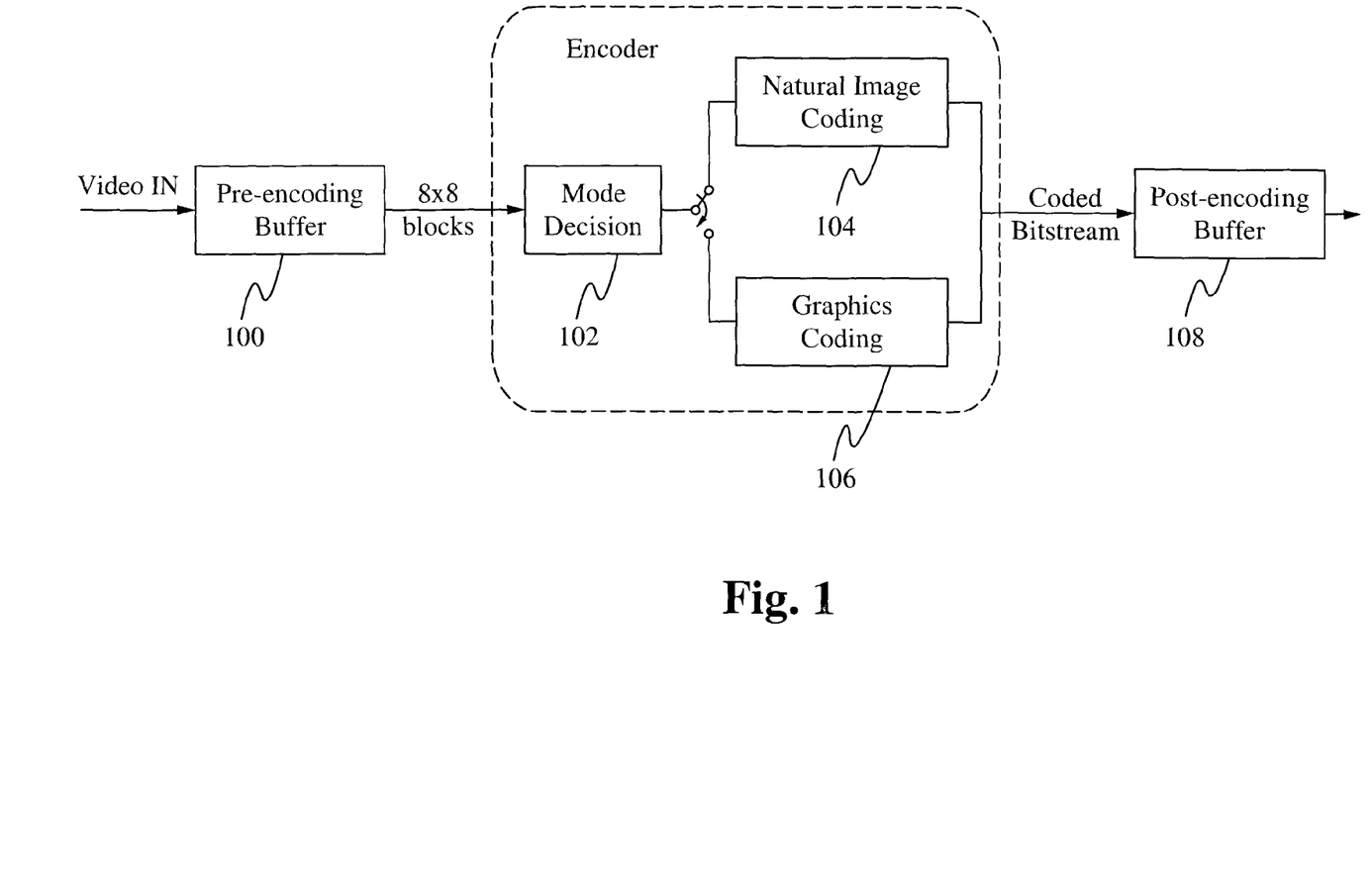
FIG. 1 illustrates a block diagram of video encoding according to some embodiments.

FIG. 1 illustrates a block diagram of video encoding according to some embodiments. A video is input into a pre-encoding buffer 100 before going to an encoder. From the pre-encoding buffer 100, blocks of a fixed size (e.g. 8×8) are sent to a mode decision module 102. The mode decision module 102 determines if the block is to be encoded using natural image coding or graphics coding (e.g. computer generated images). Natural images are those acquired for example by a camera or a camcorder, and computer generated images are those generated by a computing device. Depending on the decision in the mode decision module 102, the block goes to the natural image coding module 104 or the graphics coding module 106. A single embedded bitstream is generated from the natural coding module 104 or the graphics coding module 106 and stored in the post-encoding buffer 108. The natural image coding mode and the graphics coding mode produce a fully-embedded bitstream. Information stored at the post-encoding buffer 108 are able to be shaped to arbitrary bit-rates to adapt to an available channel bandwidth.

The encoder processes each block independently. No prediction (inter- or intra-frame) is used. In scalable coding, if prediction is used, the pixels used for prediction might be different at the encoder/decoder, which could lead to error drifting artifacts.

For the natural image coding mode, a two-dimensional (2D) discrete cosine transform (DCT) (or other spectral transforms) is applied to the block. The resulting transform coefficients are coded from the most significant bit-plane (MSB) to the least significant bit-plane (LSB) such that the resulting bitstream is embedded. This provides a low-complexity scalable coding. It is also possible to apply unequal error protection in different bit-planes.

For the graphics coding mode, no transform is performed on the block. The pixels are coded from the MSB to the LSB. For graphics coding, any appropriate coding method is able to be implemented. In some embodiments, embedded graphics coding is utilized as described in U.S. patent application Ser. No. 12/795,210, filed Jun. 7, 2010 and entitled, "EMBEDDED GRAPHICS CODING FOR IMAGES WITH SPARSE HISTOGRAMS," which is incorporated by reference herein.

The mode (natural or graphics) is decided based on the performance of the two coding modes for the block being encoded. A very low-complexity measure is used for this decision.

Figure 2:
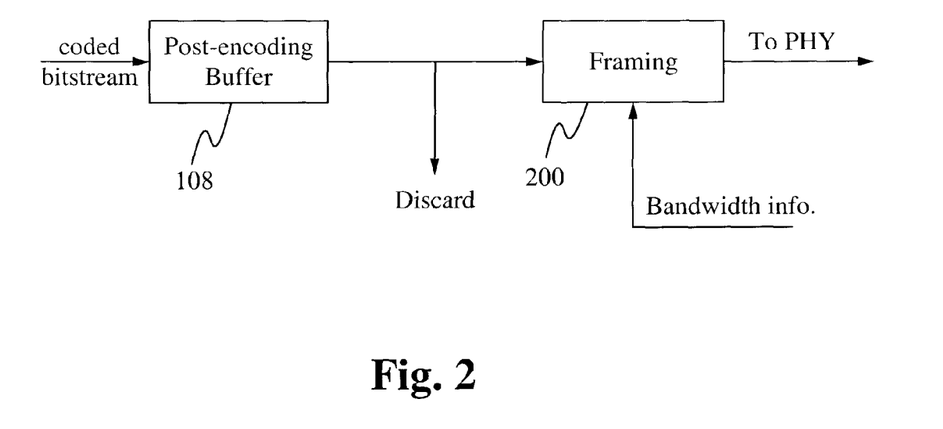
FIG. 2 illustrates a block diagram of framing according to some embodiments.

FIG. 2 illustrates a block diagram of framing according to some embodiments. As described in FIG. 1, the coded bitstream is stored in the post-encoding buffer 108. A framing module 200 is used to extract information from the post-encoding buffer 108 for each block based on the available channel bandwidth. Mode information for each block is transmitted. The remaining bits are discarded. Therefore, when available bandwidth is low, fewer bits are transmitted, but without degrading the quality of the video significantly. After framing, the information is sent to the physical layer (e.g. PHY of the OSI-model of computer networking).

In some embodiments, multiple blocks are allowed to share a total bit budget, which is referred to as bit sharing. The blocks that share the bit budget are referred to as a slice. With bit sharing enabled, through smart rate allocation, difficult blocks receive more bits than easy blocks, such that the overall coding performance is improved. However, errors are able to propagate from one block to another, but never propagate beyond the slice. The codec described herein is able to be modified to allow bit sharing between the blocks, hence improving coding performance at the cost of possibly reduced error resiliency. The trade off is able to be controlled by using slices or sub-slices (rather than a block) as a coding unit.

Figure 3:
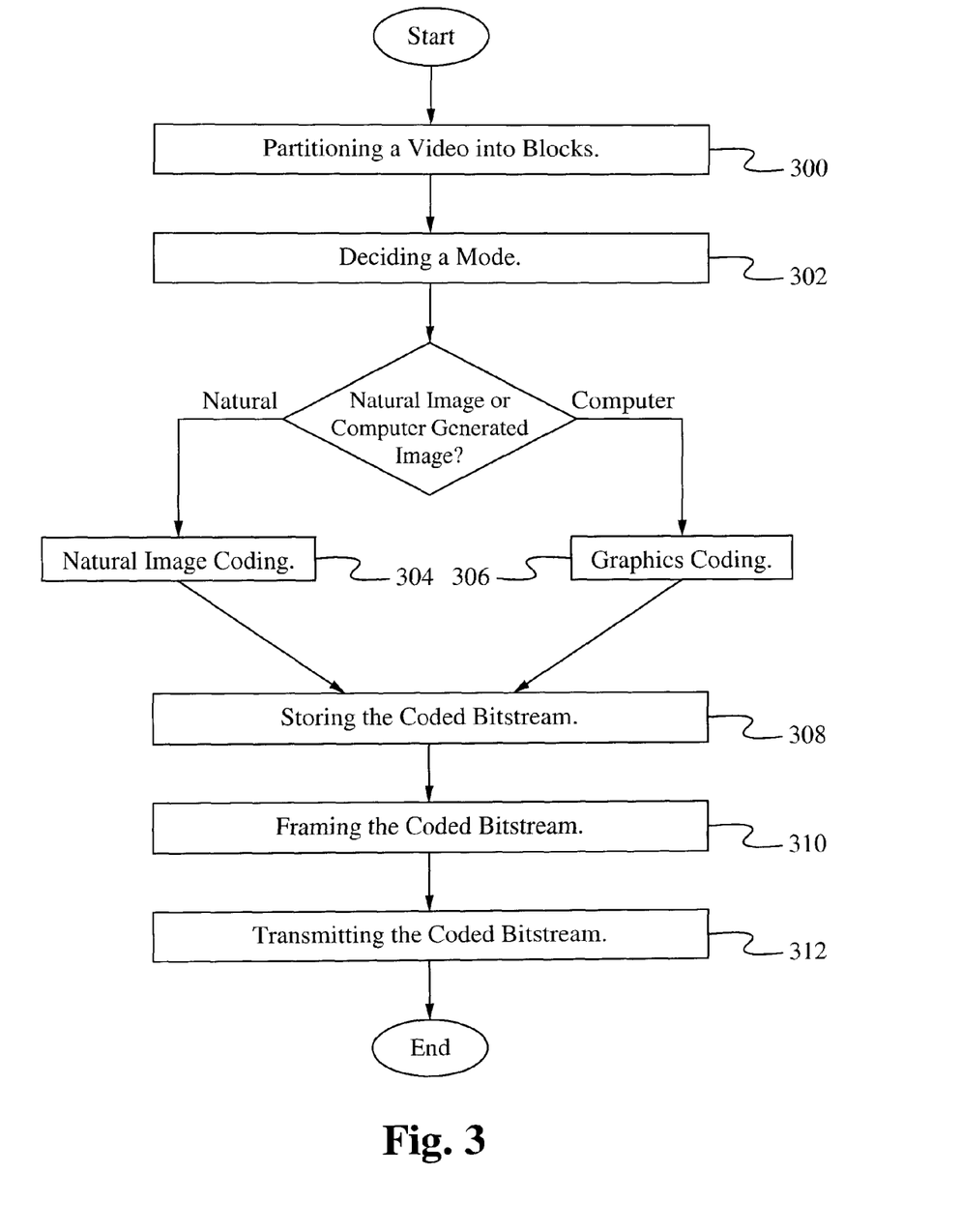
FIG. 3 illustrates a flowchart of a method of compressing data according to some embodiments.

FIG. 3 illustrates a flowchart of a method of compressing data according to some embodiments. In the step 300, data such as video is partitioned into blocks such as 8×8 blocks e.g. each frame of a video is partitioned into 8×8 blocks. In the step 302, a mode decision is made. It is determined if a block of the image is a natural image or a computer generated image. The mode (natural or graphics) is decided based on the performance of the two coding modes for the block being encoded. A very low-complexity measure is used for this decision. In the step 304, if it is determined that the block is a natural image, a natural image coding processing occurs. For the natural image coding mode, a 2D discrete cosine transform (DCT) (or other spectral transforms) is applied to the block. The resulting transform coefficients are coded from the most significant bit-plane (MSB) to the least significant bit-plane (LSB) such that the resulting bitstream is embedded. This provides a low-complexity scalable coding. It is also possible to apply unequal error protection in different bit-planes. In the step 306, if it is determined that the block is a computer generated image, a graphics coding process occurs.

For the graphics coding mode, no transform is performed on the block. The pixels are coded from the MSB to the LSB. In the step 308, the coded bitstream is stored in a post-encoding buffer. In the step 310, framing occurs. Framing includes extract information from the post-encoding buffer for each block based on the available channel bandwidth. Mode information for each block is transmitted, but the remaining bits are discarded. In the step 312, the extracted information and the mode information is transmitted to the physical layer.

Figure 4:
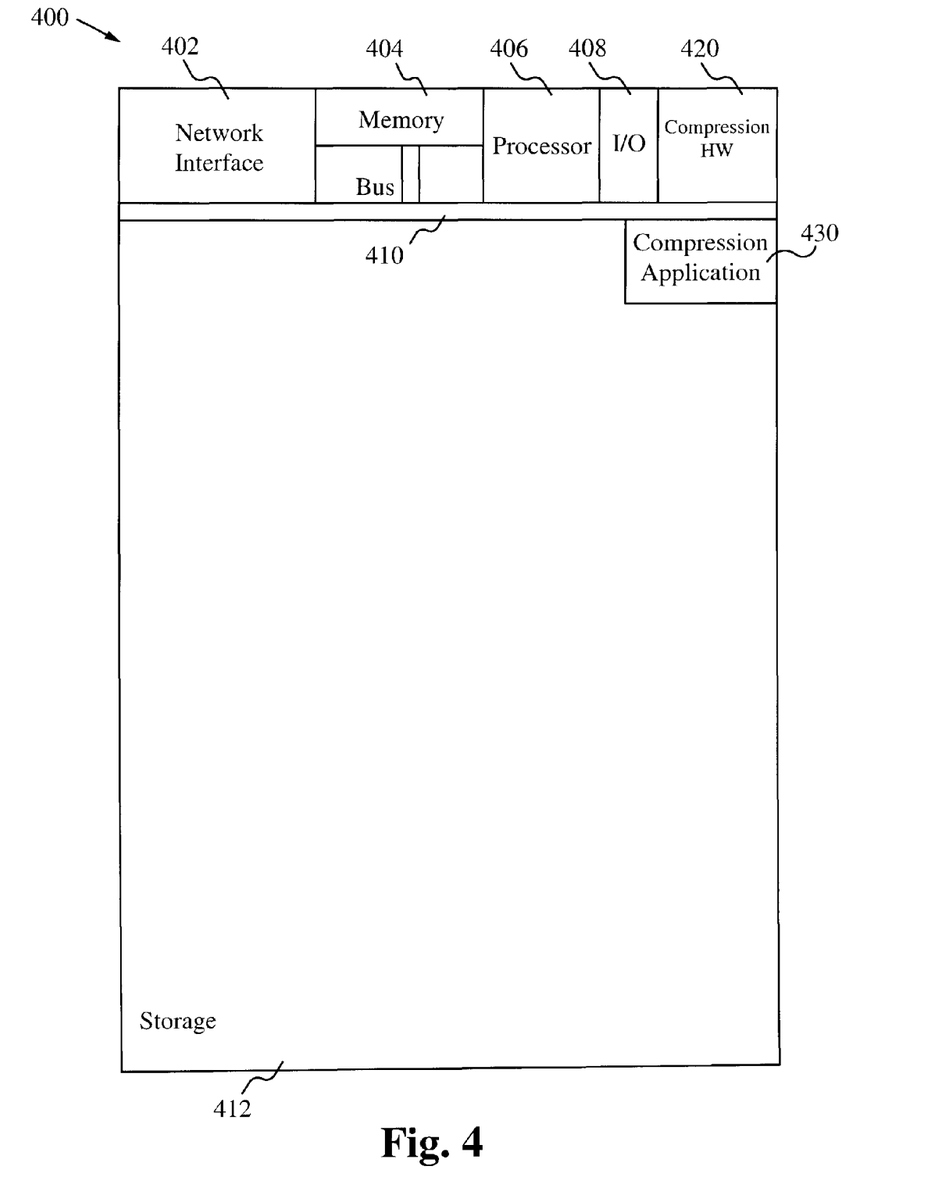
FIG. 4 illustrates a block diagram of an exemplary computing device configured to implement the dual-mode compression method according to some embodiments.

FIG. 4 illustrates a block diagram of an exemplary computing device 400 configured to implement the dual-mode compression method according to some embodiments. The computing device 400 is able to be used to acquire, store, compute, communicate and/or display information such as images and videos. For example, a computing device 400 is able to acquire and store a video. The compression method is able to be used during or after acquiring the video, or when transferring the video from the device 400 to another device. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. Compression application(s) 430 used to perform the compression method are likely to be stored in the storage device 412 and memory 404 and processed as applications are typically processed. More or less components shown in FIG. 4 are able to be included in the computing device 400. In some embodiments, compression hardware 420 is included. Although the computing device 400 in FIG. 4 includes applications 430 and hardware 420 for compression, the compression method is able to be implemented on a computing device in hardware, firmware, software or any combination thereof. For example, in some embodiments, the compression applications 430 are programmed in a memory and executed using a processor. In another example, in some embodiments, the compression hardware 420 is programmed hardware logic including gates specifically designed to implement the compression method.

In some embodiments, the compression application(s) 430 include several applications and/or modules. As described herein, modules such as a mode decision module, a natural image coding module, a graphics coding module and a framing module are able to be used for compression. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a television, a home entertainment system or any other suitable computing device.

Figure 5:
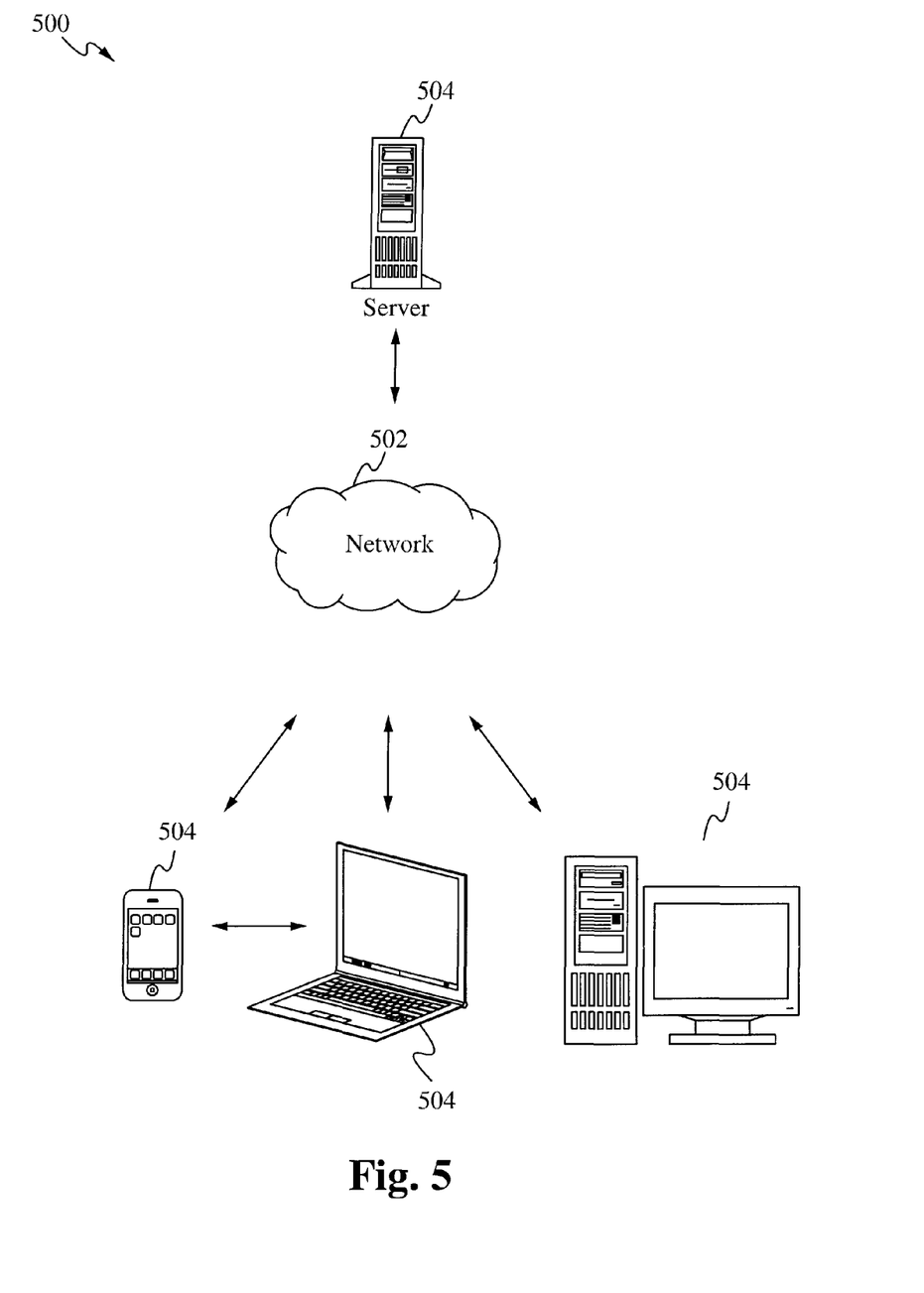
FIG. 5 illustrates a network of devices according to some embodiments.

FIG. 5 illustrates a network of devices 500 according to some embodiments. The network of devices 500 include one or more devices 504 coupled over a network 502. The network 502 is able to be any network(s) such as the Internet or a local area network. The devices 504 are able to be any devices such as the computing devices described herein. In some embodiments, the devices 504 are coupled directly. The devices 504 are able to use the compression implementation described herein to transfer compressed HD video. For example, a server 504 with an encoder stores and compresses HD video as described herein and then transfers the compressed data to mobile device 504 with a decoder so that a user is able to view the compressed data such as a video. Fewer or additional devices are able to be included.

To utilize the compression method, a user acquires a video/image such as on a digital camcorder, and while or after the video is acquired, or when sending the video to another device such as a computer, the compression method automatically compresses each image of the video, so that the video is compressed appropriately to maintain a high quality video. The compression method occurs automatically without user involvement.

In operation, the compression method described herein provides compression with a low hardware cost (e.g. not many logic gates are needed) in some embodiments, low complexity, low delay, very high visual quality and does not depend on other blocks or frames for encoding. The compression method is able to be used in any implementation including, but not limited to, wireless high definition (Wireless HD).

The image compression method described herein is able to be used with videos and/or images.

High definition video is able to be in any format including but not limited to HDCAM, HDCAM-SR, DVCPRO HD, D5 HD, XDCAM HD, HDV and AVCHD.

Some Embodiments of Dual-Mode Compression of Images and Videos for Reliable Real-Time Transmission 1. A method of compression programmed in a controller in a device comprising:
   a. partitioning an image into one or more blocks;
   b. determining if a block of the image is from a natural image or a computer generated image;
   c. if the block is from a natural image, then a natural image coding is applied to the block, generating a coded bitstream; and
   d. if the block is from a computer generated image, then a graphics coding is applied to the block generating the coded bitstream.
2. The method of clause 1 wherein natural image coding comprises:
   a. applying a spectral transform to the block; and
   b. coding resulting transform coefficients from the most significant bit-plane (MSB) to the least significant bit-plane (LSB) such that a resulting bitstream is embedded.
3. The method of clause 1 wherein the graphics coding mode includes:
   a. coding pixels in the block from the most significant bit-plane (MSB) to the least significant bit-plane (LSB); and
   b. not performing a transform on the block.
4. The method of clause 1 further comprising applying unequal error protection in different bit-planes.
5. The method of clause 1 wherein determining the mode is based on a performance of the two coding modes for the block being encoded.
6. The method of clause 1 further comprising storing the coded bitstream in a post-encoding buffer.
7. The method of clause 6 further comprising extracting information from the post-encoding buffer for each block based on available channel bandwidth, transmitting mode information for the block, and discarding remaining bits.
8. The method of clause 7 further comprising transmitting the extracted information and the mode information to a physical layer.
9. The method of clause 1 wherein the controller is selected from the group consisting of a programmed computer readable medium and an application-specific circuit.
10. The method of clause 1 further comprising bit sharing between blocks.
11. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.
12. A system for compression programmed in a controller in a device, the system comprising:
   a. a mode decision module for determining if a block of an image is from a natural image or a computer generated image;
   b. a natural image coding module for generating a coded bitstream by applying a natural image coding to the block if the block is from a natural image; and
   c. a graphics coding module for generating the coded bitstream by applying a graphics coding to the block if the block is from a computer generated image.
13. The system of clause 12 further comprising a pre-encoding buffer for partitioning an image into one or more blocks.
14. The system of clause 12 wherein natural image coding comprises:
   a. applying a spectral transform to the block; and
   b. coding resulting transform coefficients from the most significant bit-plane (MSB) to the least significant bit-plane (LSB) such that the resulting bitstream is embedded.
15. The system of clause 12 wherein the graphics coding mode includes:
   a. coding pixels in the block from the most significant bit-plane (MSB) to the least significant bit-plane (LSB); and
   b. not performing a transform on the block.
16. The system of clause 12 wherein the mode decision module determines the mode based on a performance of the two coding modes for the block being encoded.
17. The system of clause 12 further comprising a post-encoding buffer for storing the coded bitstream.
18. The system of clause 17 further comprising a framing module for extracting information from the post-encoding buffer for each block based on available channel bandwidth, transmitting mode information for the block, and discarding remaining bits.
19. The system of clause 18 wherein the framing module transmits the extracted information and the mode information to a physical layer.
20. The system of clause 12 wherein the controller is selected from the group consisting of a programmed computer readable medium and an application-specific circuit.
21. The system of clause 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

22. A camera device comprising:
   a. a video acquisition component for acquiring a video;
   b. a memory for storing an application, the application for:
      i. partitioning an image into one or more blocks;
      ii. determining if a block of the image is from a natural image or a computer generated image;
      iii. if the block is from a natural image, then a natural image coding is applied to the block generating a coded bitstream; and
      iv. if the block is from a computer generated image, then a graphics coding is applied to the block generating the coded bitstream; and
   c. a processing component coupled to the memory, the processing component configured for processing the application.

23. A network of devices comprising:
   a. a network;
   b. a server device for storing a high definition video and for transferring a compressed version of the high definition video over the network, wherein the compressed version of the high definition video is generated by:
      i. partitioning each image of the video into one or more blocks;
      ii. determining if a block of the image is from a natural image or a computer generated image;
      iii. if the block is from a natural image, then a natural image coding is applied to the block generating a coded bitstream; and
      iv. if the block is from a computer generated image, then a graphics coding is applied to the block generating the coded bitstream; and
   c. a player device for receiving the compressed version of the high definition video and for playing the compressed version of the high definition video.

24. The network of devices of clause 23 wherein the compressed version of the high definition video is decoded before being played.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of compression programmed in a controller in a device comprising:
   a. partitioning an image into one or more blocks;
   b. determining if a block of the image is from a natural image or a computer generated image;
   c. if the block is from a natural image, then a natural image coding is applied to the block, generating a coded bitstream;
   d. if the block is from a computer generated image, then a graphics coding is applied to the block generating the coded bitstream;
   e. bit sharing between blocks, wherein the blocks that share bits comprise a slice, and an error is not able to propagate beyond the slice;
   f. storing the coded bitstream in a post-encoding buffer; and
   g. extracting information from the post-encoding buffer for each block based on available channel bandwidth, transmitting mode information for the block, and discarding remaining bits.

2. The method of claim 1 wherein natural image coding comprises:
   a. applying a spectral transform to the block; and
   b. coding resulting transform coefficients from the most significant bit-plane (MSB) to the least significant bit-plane (LSB) such that a resulting bitstream is embedded.

3. The method of claim 1 wherein the graphics coding mode includes:
   a. coding pixels in the block from the most significant bit-plane (MSB) to the least significant bit-plane (LSB); and
   b. not performing a transform on the block.

4. The method of claim 1 further comprising applying unequal error protection in different bit-planes.

5. The method of claim 1 wherein determining a mode is based on a performance of the two coding modes for the block being encoded.

6. The method of claim 1 further comprising transmitting the extracted information and the mode information to a physical layer.

7. The method of claim 1 wherein the controller is selected from the group consisting of a programmed computer readable medium and an application-specific circuit.

8. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music device, a video player, a DVD writer/player, a television and a home entertainment system.

9. A system for compression programmed in a controller in a device, the system comprising:
   a. a mode decision module configured for determining if a block of an image is from a natural image or a computer generated image;
   b. a natural image coding module configured for generating a coded bitstream by applying a natural image coding to the block if the block is from a natural image;
   c. a graphics coding module configured for generating the coded bitstream by applying a graphics coding to the block if the block is from a computer generated image;
   d. a bit sharing module configured for bit sharing between blocks, wherein the blocks that share bits comprise a slice, and an error is not able to propagate beyond the slice; and
   e. a framing module configured for extracting information from a post-encoding buffer for each block based on available channel bandwidth, transmitting mode information for the block, and discarding remaining bits.

10. The system of claim 9 further comprising a pre-encoding buffer for partitioning an image into one or more blocks.

11. The system of claim 9 wherein natural image coding comprises:
   a. applying a spectral transform to the block; and
   b. coding resulting transform coefficients from the most significant bit-plane (MSB) to the least significant bit-plane (LSB) such that the resulting bitstream is embedded.

12. The system of claim 9 wherein the graphics coding mode includes:

a. coding pixels in the block from the most significant bit-plane (MSB) to the least significant bit-plane (LSB); and
b. not performing a transform on the block.

13. The system of claim 9 wherein the mode decision module determines the mode based on a performance of the two coding modes for the block being encoded.

14. The system of claim 9 further comprising a post-encoding buffer for storing the coded bitstream.

15. The system of claim 9 wherein the framing module transmits the extracted information and the mode information to a physical layer.

16. The system of claim 9 wherein the controller is selected from the group consisting of a programmed computer readable medium and an application-specific circuit.

17. The system of claim 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music device, a video player, a DVD writer/player, a television and a home entertainment system.

18. A camera device comprising:
a. a video acquisition component configured for acquiring a video;
b. a memory for storing an application, the application for:
   i. partitioning an image into one or more blocks;
   ii. independently processing each of the one or more blocks including determining if a block of the image is from a natural image or a computer generated image;
   iii. if the block is from a natural image, then a natural image coding is applied to the block generating a coded bitstream;
   iv. if the block is from a computer generated image, then a graphics coding is applied to the block generating the coded bitstream;
   v. bit sharing between blocks, wherein the blocks that share bits comprise a slice and an error is not able to propagate beyond the slice;
   vi. storing the coded bitstream in a post-encoding buffer;
   vii. extracting information from the post-encoding buffer for each block based on available channel bandwidth, transmitting mode information for the block, and discarding remaining bits; and
   viii. transmitting the extracted information and the mode information to a physical layer; and
c. a processing component coupled to the memory, the processing component configured for processing the application.

19. A network of devices comprising:
a. a network;
b. a server device for storing a high definition video and for transferring a compressed version of the high definition video over the network, wherein the compressed version of the high definition video is generated by:
   i. partitioning each image of the video into one or more blocks;
   ii. determining if a block of the image is from a natural image or a computer generated image;
   iii. if the block is from a natural image, then a natural image coding is applied to the block generating a coded bitstream;
   iv. if the block is from a computer generated image, then a graphics coding is applied to the block generating the coded bitstream;
   v. bit sharing between blocks, wherein the blocks that share bits comprise a slice and an error is not able to propagate beyond the slice;
   vi. storing the coded bitstream in a post-encoding buffer;
   vii. extracting information from the post-encoding buffer for each block based on available channel bandwidth, transmitting mode information for the block, and discarding remaining bits; and
   viii. transmitting the extracted information and the mode information to a physical layer; and
c. a player device for receiving the compressed version of the high definition video and for playing the compressed version of the high definition video.

20. The network of devices of claim 19 wherein the compressed version of the high definition video is decoded before being played.

21. A method of compression programmed in a controller in a device comprising:
a. partitioning an image into one or more fixed-size blocks;
b. determining if a block of the image is from a natural image or a computer generated image;
c. if the block is from a natural image, then applying a natural image coding to the block without using prediction, generating a coded bitstream;
d. if the block is from a computer generated image, then applying a graphics coding to the block without using prediction, generating the coded bitstream;
e. storing the coded bitstream in a post-encoding buffer;
f. extracting information from the post-encoding buffer for each block based on available channel bandwidth; and
g. transmitting mode information for the block.

* * * * *